United States Patent
Matsuo et al.

(10) Patent No.: US 11,809,093 B2
(45) Date of Patent: Nov. 7, 2023

(54) OPTICAL SCANNING DEVICE AND IMAGE FORMING APPARATUS

(71) Applicant: SHARP KABUSHIKI KAISHA, Sakai (JP)

(72) Inventors: Manabu Matsuo, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 107 days.

(21) Appl. No.: 17/108,639

(22) Filed: Dec. 1, 2020

(65) Prior Publication Data
US 2021/0173323 A1    Jun. 10, 2021

(30) Foreign Application Priority Data
Dec. 10, 2019 (JP) ................................ 2019-223123

(51) Int. Cl.
*G03G 15/04* (2006.01)
*G02B 26/12* (2006.01)

(52) U.S. Cl.
CPC ..... *G03G 15/04036* (2013.01); *G02B 26/124* (2013.01); *G03G 15/0409* (2013.01)

(58) Field of Classification Search
CPC ......... G03G 15/04036; G03G 15/0409; G03G 21/1652; G02B 26/124; G02B 26/122; G02B 26/127
See application file for complete search history.

(56) References Cited

U.S. PATENT DOCUMENTS

| | | |
|---|---|---|
| 5,963,356 A | 10/1999 | Kato |
| 2003/0234856 A1 | 12/2003 | Jin |
| 2008/0225105 A1 | 9/2008 | Kudo |
| 2008/0267663 A1 | 10/2008 | Ichii et al. |

FOREIGN PATENT DOCUMENTS

| | | | |
|---|---|---|---|
| JP | H7-281113 A | | 10/1995 |
| JP | 2000249957 A | | 9/2000 |
| JP | 2002055291 A | * | 2/2002 |
| JP | 2008-225060 A | | 9/2008 |
| JP | 2008-281664 A | | 11/2008 |
| JP | 2017-227739 A | | 12/2017 |

OTHER PUBLICATIONS

English machine translation of Kuroda et al. (JP 2002-055291 A) (Year: 2002).*

* cited by examiner

*Primary Examiner* — Walter L Lindsay, Jr.
*Assistant Examiner* — Geoffrey T Evans
(74) *Attorney, Agent, or Firm* — ScienBiziP, P.C.

(57) ABSTRACT

An optical scanning device includes a light source and a beam detector for taking a main scanning start time of a light beam emitted from the light source and deflection-scanned by a deflection-scanning component to a predetermined main scanning direction. On the light source and the beam detector, the emission side of the light source and the light receiving side of the beam detector face the light-incident side of an fθ lens, which is longer in the main scanning direction. The light source is arranged on the upstream side in the main scanning direction and the beam detector is arranged on the downstream side in the main scanning direction, or the beam detector is arranged on the upstream side in the main scanning direction and the light source is arranged on the downstream side in the main scanning direction.

20 Claims, 14 Drawing Sheets

OPTICAL SCANNING DEVICE AND IMAGE FORMING APPARATUS

BACKGROUND OF THE INVENTION

Field of the Invention

The present invention relates to an optical scanning device and an image forming apparatus such as a copy machine, a multifunction peripheral, a printer, or a facsimile machine.

Description of the Background Art

Generally, in optical scanning devices, to take a main scanning start time of an light beam emitted from a light source (for example, a laser diode element) and deflection-scanned by a deflection-scanning component (for example, a rotary polygon mirror) in a predetermined main scanning direction, the optical scanning device receives, by using a beam detector, the light beam at a time before the start of the main scan and outputs a beam detection signal from the beam detector indicating the time before the start of the main scan. In many of such optical scanning devices, the emission side of the light source and the light receiving side of the beam detector face a longitudinal direction of an fθ lens that is longest in the main scanning direction and emits a light beam deflection-scanned by a deflection-scanning component. In addition, the light source and the beam detector are often provided on one side of the fθ lens in the longitudinal direction of the housing (as in, for example, Japanese Unexamined Patent Publication No. 2017-227739), or provided on both sides.

In such an optical scanning device, wasted space (for example, space between the light source and the deflection-scanning component) is easily created, which leads to an increase in the size of the housing. Therefore, a decrease in the size of the housing is desired.

Hence, an object of the present invention is to provide an optical scanning device and an image forming apparatus that can have a housing with a decreased size.

SUMMARY OF THE INVENTION

In order to solve the above problem, the optical scanning device according to the present invention is an optical scanning device that includes a light source and a beam detector for taking the main scanning start time of a light beam emitted from the light source and deflection-scanned in a predetermined main scanning direction by a deflection-scanning component. On the light source and the beam detector, the emission side of the light source and the light receiving side of the beam detector face the light-incident side of an fθ lens, which is longest in the main scanning direction. The light source is arranged on the upstream side in the main scanning direction and the beam detector is arranged on the downstream side in the main scanning direction. Alternatively, the beam detector is arranged on the upstream side in the main scanning direction and the light source is arranged on the downstream side in the main scanning direction. Further, the image forming apparatus according to the present invention includes the optical scanning device of the present invention.

According to the present invention, it is possible to decrease the size of the housing.

DESCRIPTION OF THE PREFERRED EMBODIMENTS

Figure 1:
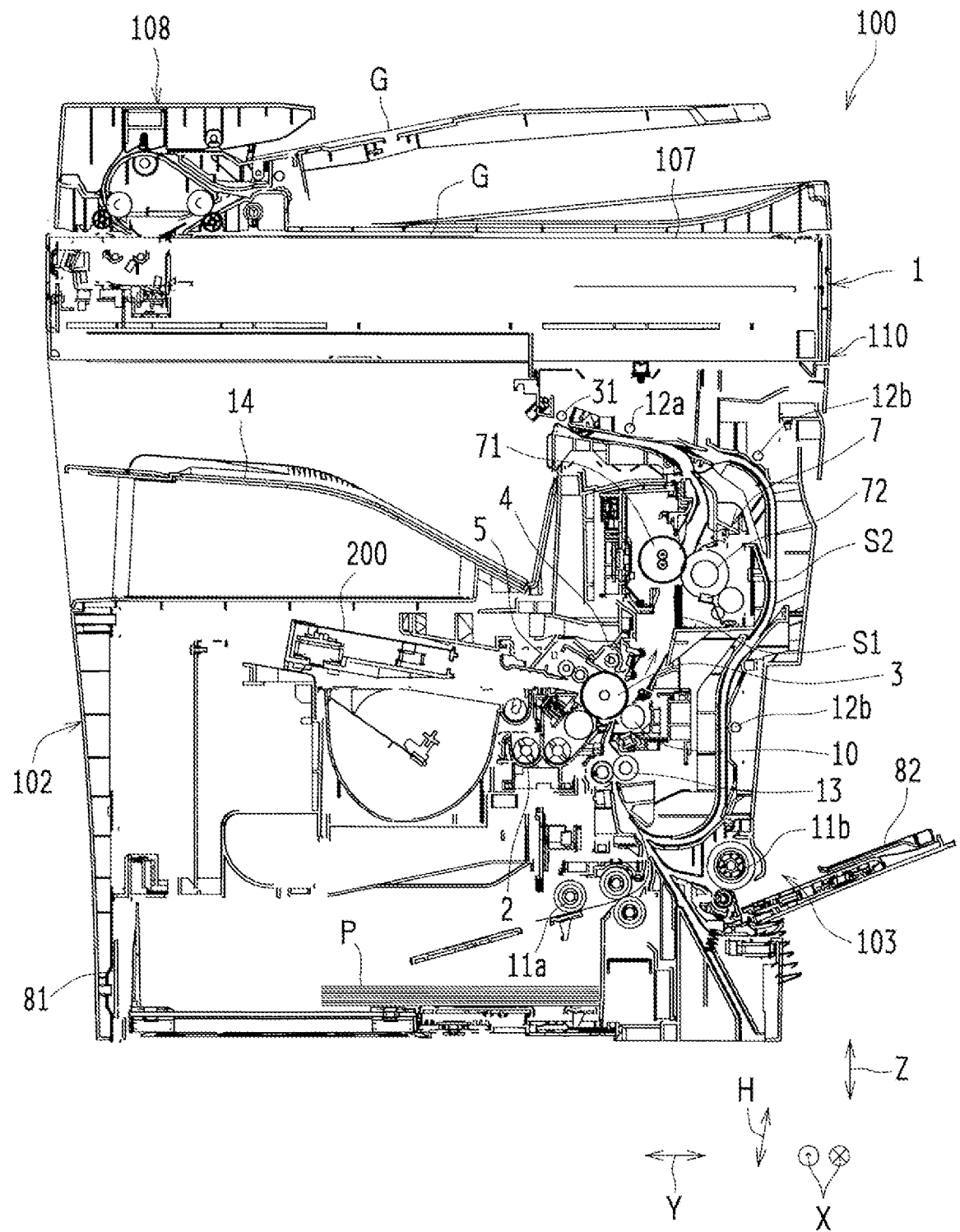
FIG. 1 is a schematic cross-sectional view of an image forming apparatus according to the present embodiment as viewed from the front.

Hereinafter, embodiments according to the present invention will be described with reference to the drawings. In the following description, the same parts are designated by the same reference numerals. The names and functions of these parts are the same. Therefore, the detailed description of these parts will not be repeated.

Image Forming Apparatus

FIG. 1 is a schematic cross-sectional view of the image forming apparatus 100 according to the present embodiment as viewed from the front. In FIG. 1, reference numeral X represents a depth direction, reference numeral Y represents a left and a right direction (width direction), and reference numeral Z represents an up and a down direction (height direction).

The image forming apparatus 100 according to the present embodiment is a monochrome image forming apparatus. The image forming apparatus 100 performs an image forming process according to image data read by the image reading device 1 or image data transmitted from outside. It is noted that the image forming apparatus 100 may also be a color image forming apparatus that forms multicolor and monochromatic images on the paper P.

The image forming apparatus 100 includes a document feeder 108 and an image forming apparatus main body 110. The image forming apparatus main body 110 is provided with an image forming unit 102 and a paper conveying system 103.

The image forming unit 102 includes an optical scanning device 200 (optical scanning unit), a developing unit 2, a photoreceptor drum 3 that acts as an electrostatic latent image carrier, a cleaning unit 4, a charging device 5, and a fixing unit 7. Further, the paper conveying system 103 includes a paper feed tray 81, a manual paper feed tray 82, a discharge roller 31, and a discharge tray 14.

An image reading device 1 for reading an image of the document G is provided on the upper part of the image forming apparatus main body 110. The image reading device 1 includes a document placing table 107 on which the document G is placed. Further, a document feeder 108 is provided on the upper side of the document placing table 107. In the image forming apparatus 100, the image of the document G read by the image reading device 1 is sent to the image forming apparatus main body 110 as image data, and the image is recorded on the paper P.

The image forming apparatus main body 110 is provided with a paper conveyance path S1. The paper feed tray 81 or the manual paper feed tray 82 supplies the paper P to the paper conveyance path S1. The paper conveyance path S1 guides the paper P to the discharge tray 14 via the transfer roller 10 and the fixing unit 7. The fixing unit 7 heats and fixes the toner image formed on the paper P onto the paper P. Pickup rollers 11a and 11b, conveyance roller 12a, registration roller 13, transfer roller 10, heat roller 71 and pressure roller 72 in the fixing unit 7, and discharge roller 31 are arranged in the vicinity of the paper conveyance path S1.

In the image forming apparatus 100, the paper P supplied by the paper feed tray 81 or the manual paper feed tray 82 is conveyed to the registration roller 13. Next, the paper P is conveyed to the transfer roller 10 by the registration roller 13 at a time at which the paper P is aligned with the toner image on the photoreceptor drum 3. The toner image on the photoreceptor drum 3 is transferred onto the paper P by the transfer roller 10. After that, the paper P passes through the heat roller 71 and the pressure roller 72 in the fixing unit 7, and is discharged onto the discharge tray 14 via the conveyance roller 12a and the discharge roller 31. When an image is formed not only on the front surface of the paper P but also on the back surface, the paper P is conveyed from the discharge roller 31 to the reverse paper conveyance path S2 in the opposite direction. The front and back of the paper P are reversed and the paper P is again guided to the registration roller 13 via the reverse transfer rollers 12b. Then, after a toner image is formed and fixed on the back surface in the same manner as on the front surface, the paper P is discharged toward the discharge tray 14.

Optical Scanning Device

Figure 2:
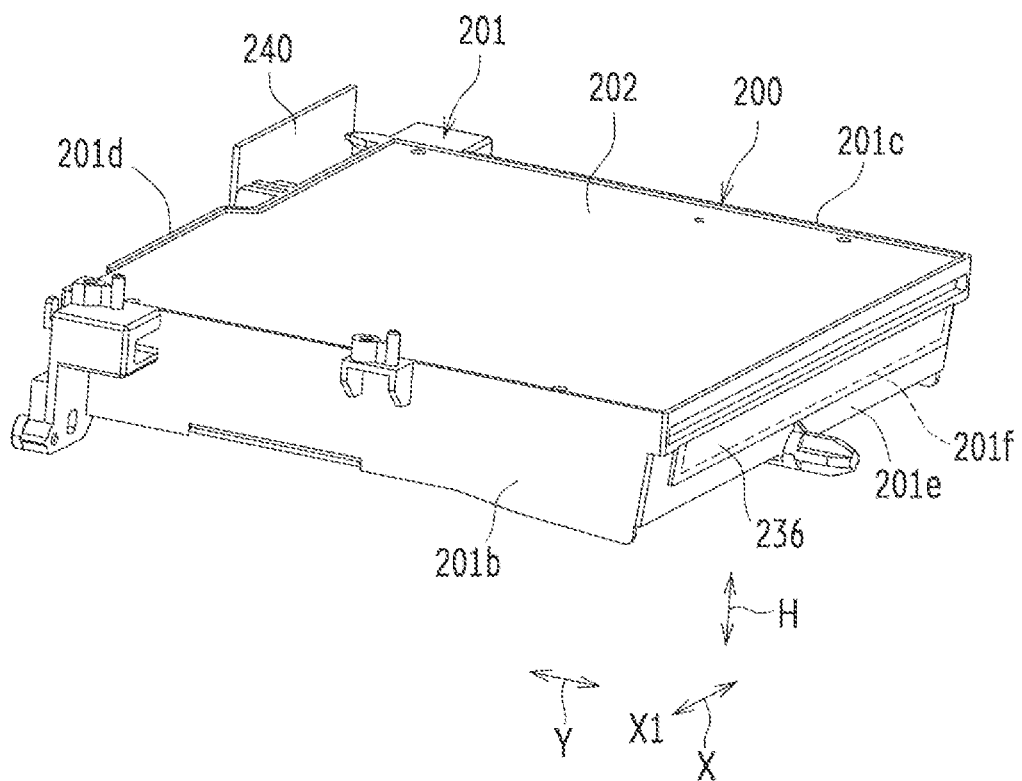
FIG. 2 is a perspective view of the front side of the optical scanning device of the image forming apparatus illustrated in FIG. 1 as viewed from the upper right.
Figure 3:
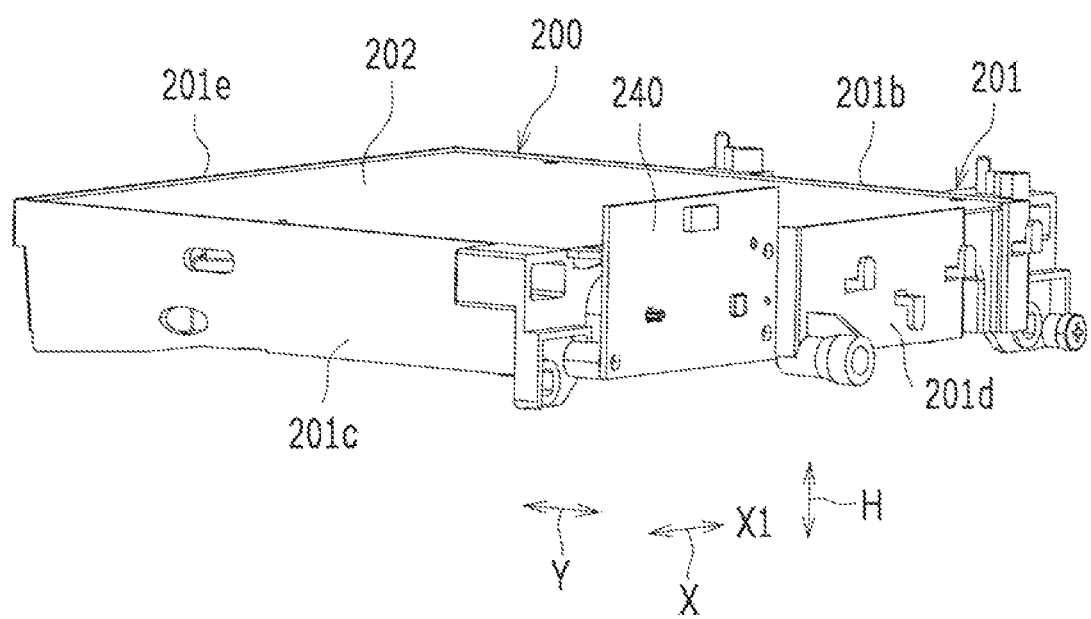
FIG. 3 is a perspective view of the back side of the optical scanning device illustrated in FIG. 2 as viewed from the upper left.
Figure 4:
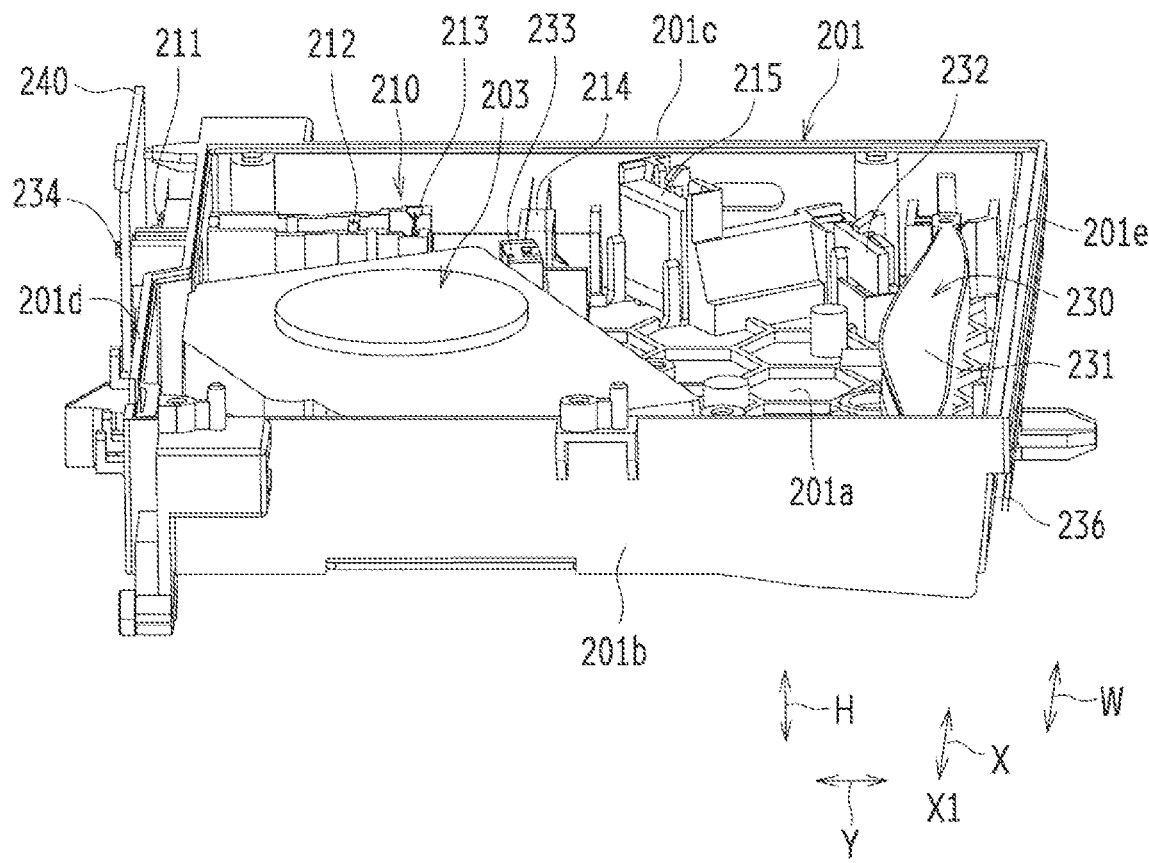
FIG. 4 is a perspective view of the optical scanning device illustrated in FIG. 2, in which the upper lid is removed, as viewed from above on the front side.
Figure 5:
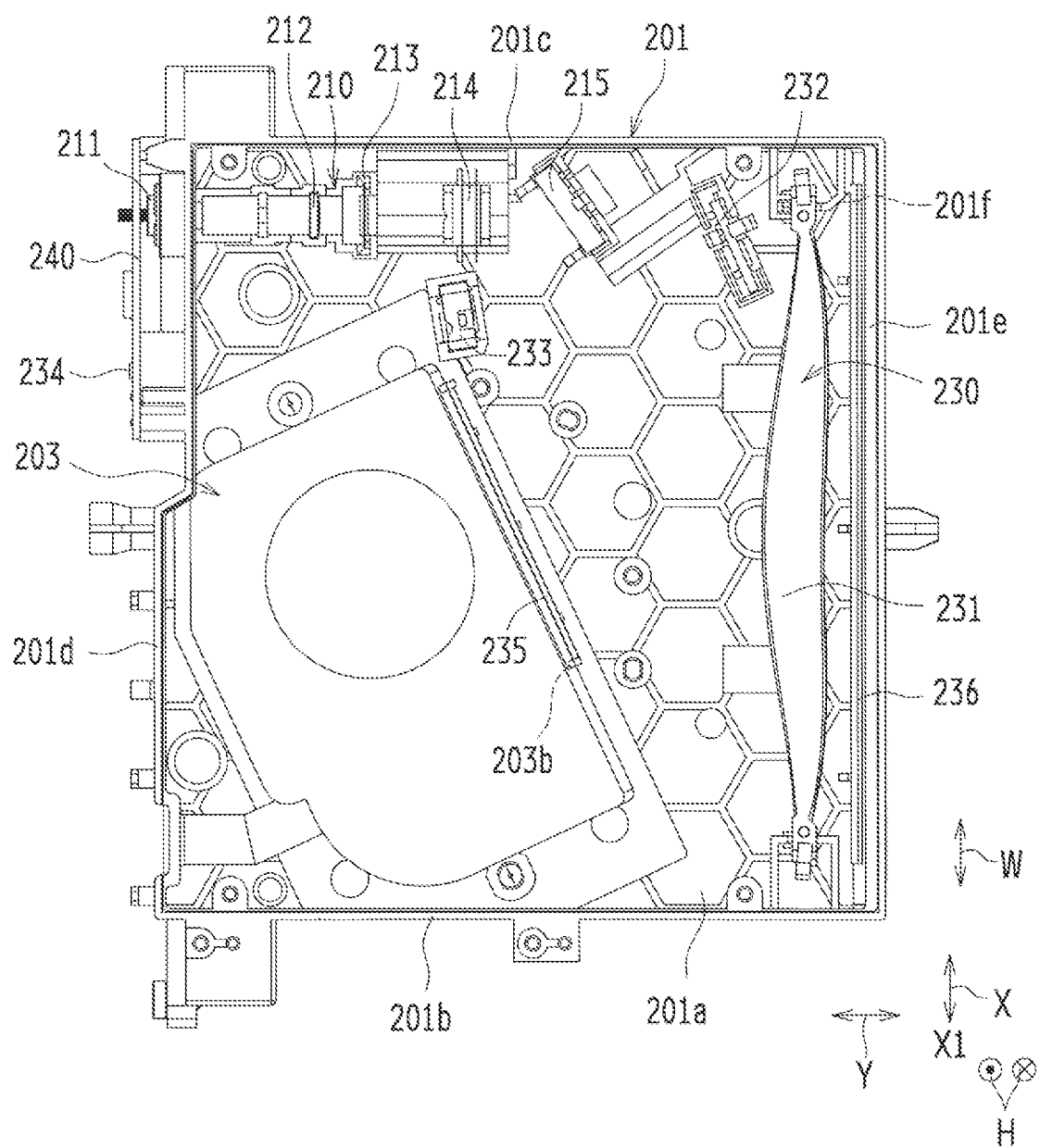
FIG. 5 is a plan view showing the optical scanning device shown in FIG. 4.
Figure 6:
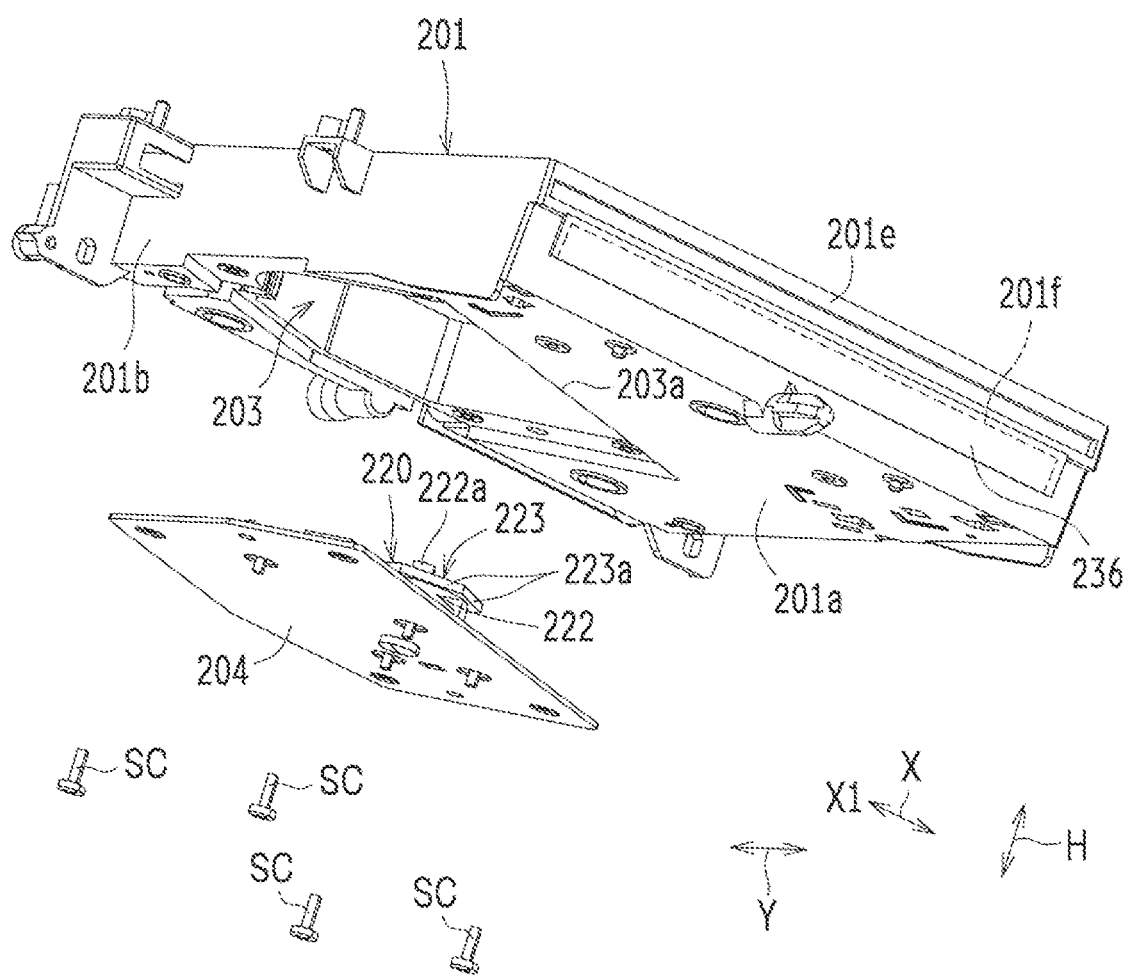
FIG. 6 is an exploded perspective view illustrating a state in which the lower lid of the optical scanning device is removed.
Figure 7:
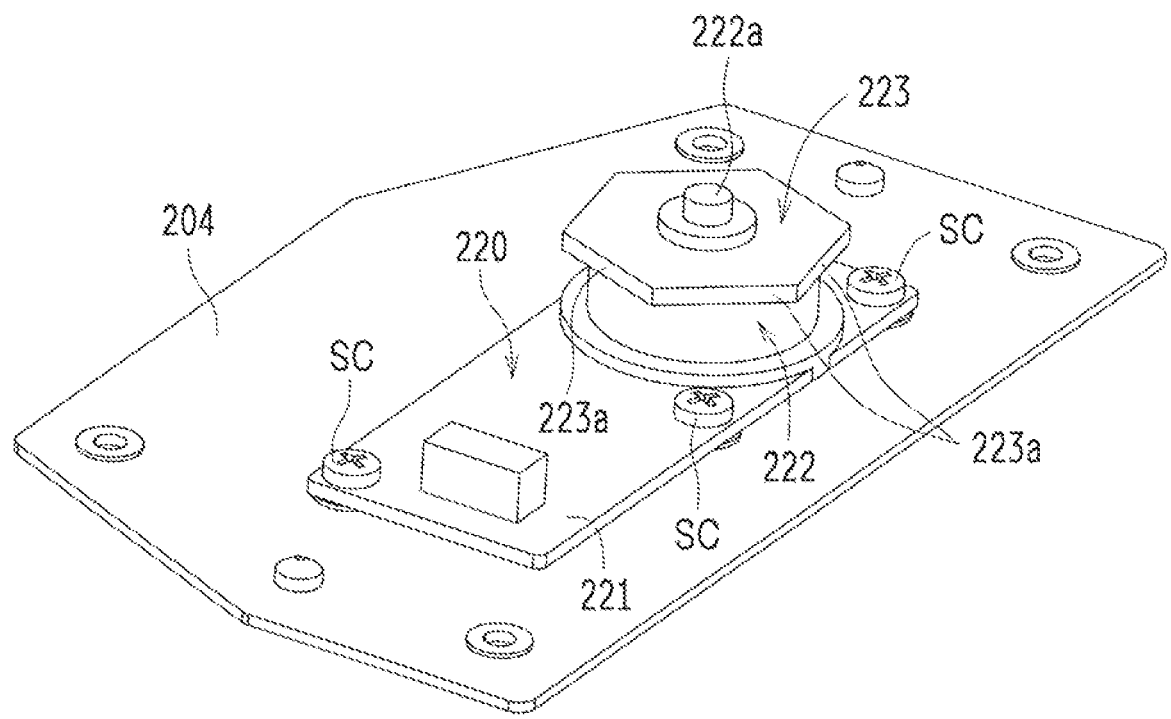
FIG. 7 is a perspective view showing an example of a deflection-scanning unit in an optical scanning device.
Figure 7:
Figure 8A:
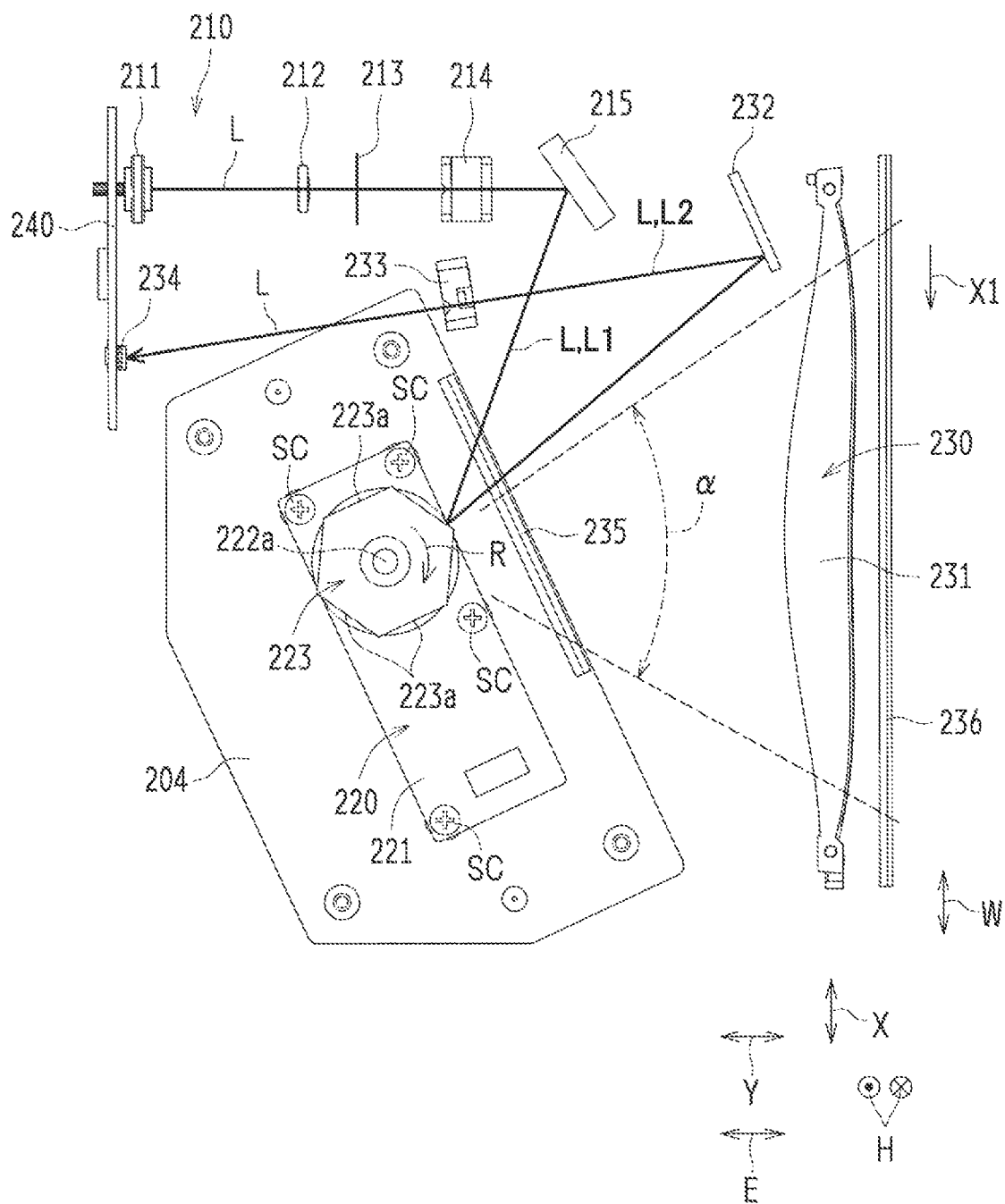
FIG. 8A is a plan view illustrating an example of the configuration of an optical system in an optical scanning device.
Figure 8B:
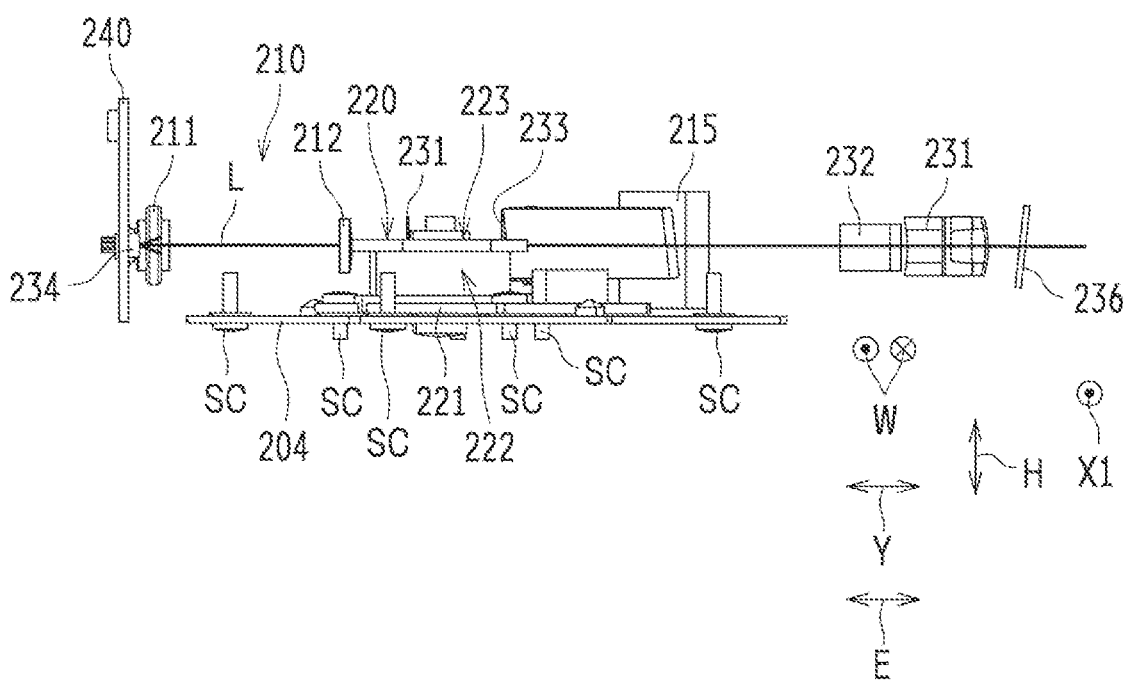
FIG. 8B is a front view illustrating an example of the configuration of an optical system in an optical scanning device.
Figure 9:
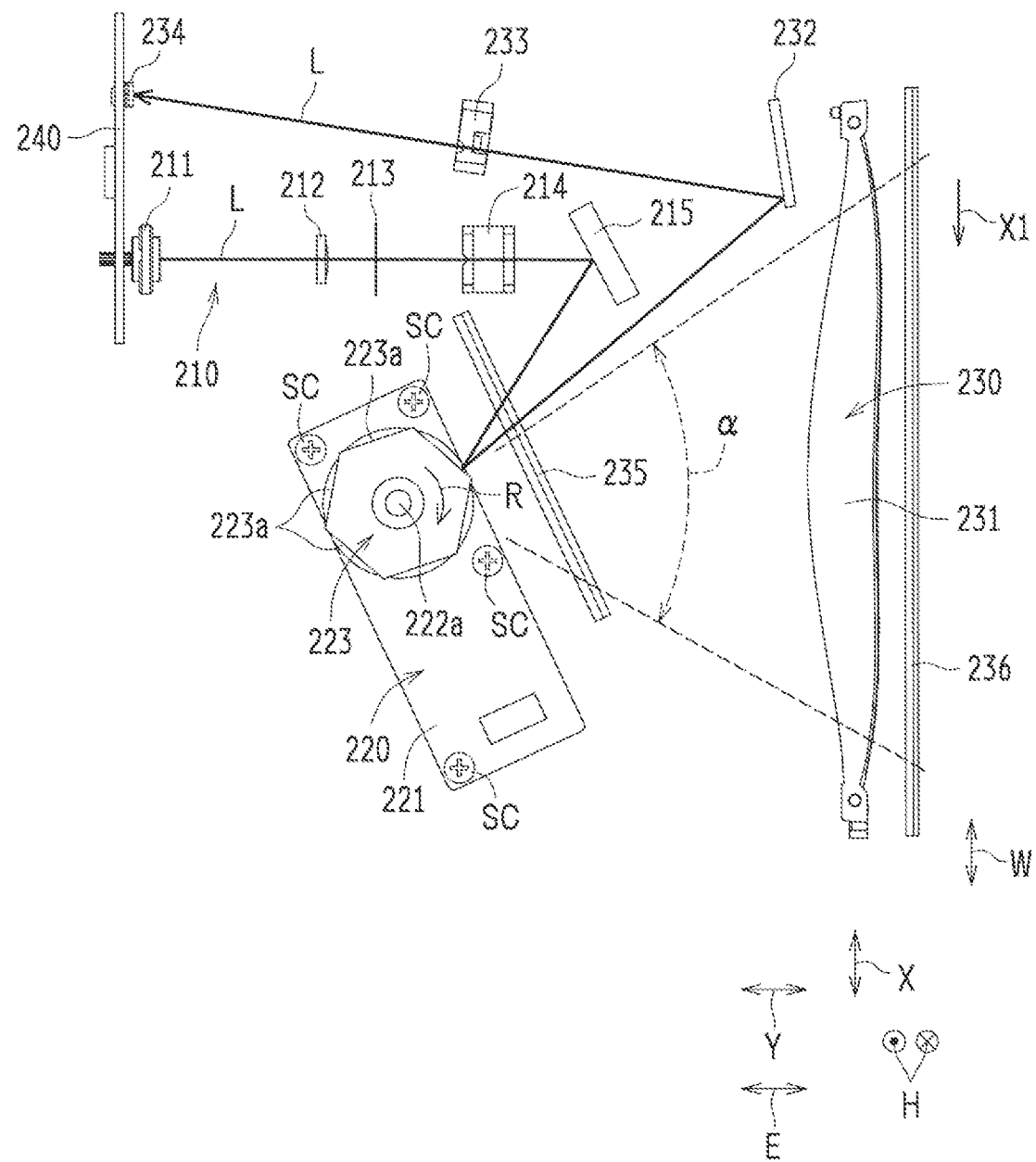
FIG. 9 is a plan view illustrating another example of the configuration of an optical system in an optical scanning device.

FIG. 2 is a perspective view of the front side of the optical scanning device 200 in the image forming apparatus 100 illustrated in FIG. 1 as viewed from the upper right. FIG. 3 is a perspective view of the back side of the optical scanning device 200 illustrated in FIG. 2 as viewed from the upper left. FIG. 4 is a perspective view of the optical scanning device 200 illustrated in FIG. 2, in which the upper lid 202 is removed, as viewed from above on the front side. FIG. 5 is a plan view illustrating the optical scanning device 200 shown in FIG. 4. FIG. 6 is an exploded perspective view illustrating a state in which the lower lid 204 of the optical scanning device 200 is removed. FIG. 7 is a perspective view illustrating an example of the deflection-scanning unit 220 in the optical scanning device 200. FIGS. 8A and 8B are a plan view and a front view, each respectively illustrating an example of the configuration of the optical system in the optical scanning device 200. Further, FIG. 9 is a plan view illustrating another example of the configuration of the optical system in the optical scanning device 200. In FIGS. 2 to 9 and in FIGS. 10 to 12B described later, reference numeral X represents the main scanning direction (longitudinal direction of the fθ lens 231), reference numeral Y represents the direction orthogonal to both the main scanning direction X and the direction of the rotational axis (height direction H) of the deflection-scanning component 223, and the reference numeral H represents the direction of the rotational axis (height direction) of the deflection-scanning component 223.

The optical scanning device 200 includes a housing 201, an incident optical system 210, a deflection-scanning unit 220 (deflection scanner), and an emission optical system 230.

The incident optical system 210 includes a light source 211 (laser diode element), a collimator lens 212, an aperture component 213, a cylindrical lens 214, and a light source reflecting mirror 215. The light source 211 emits a light beam L (laser beam). The collimator lens 212 exposes the aperture component 213 to the light beam L from the light source 211 as substantially parallel light. The aperture component 213 narrows the light beam L from the collimator lens 212 and exposes the cylindrical lens 214 to the light beam L. The cylindrical lens 214 causes the light beam L from the aperture component 213 to converge only in the sub-scanning direction and focuses the light beam L on a reflective surface 223a of the deflection-scanning component 223 (polygon mirror) via the light source reflecting mirror 215. The light source reflecting mirror 215 guides the light beam L from the cylindrical lens 214 to a reflective surface 223a of the deflection-scanning component 223 (polygon mirror).

The deflection-scanning unit 220 includes a deflection-scanning substrate 221, a deflection-scanning motor 222 (polygon motor), and a deflection-scanning component 223 (rotary polygon mirror (polygon mirror)). The deflection-scanning substrate 221 is attached to the flat surface (upper surface) side of the lower lid 204 by a plurality of attachment components (screws) SC. A deflection-scanning motor 222 is provided on the deflection-scanning substrate 221. A deflection-scanning component 223 is attached to the rotating shaft 222a of the deflection-scanning motor 222. The deflection-scanning component 223 deflection-scans the light beam L from the light source reflecting mirror 215 in a predetermined main scanning direction X1.

The emission optical system 230 includes an fθ lens 231, a beam-detection reflecting mirror 232, a beam detection lens 233 (focusing lens), and a beam detector 234 (beam detection sensor (BD sensor)).

The fθ lens 231 has a shape that is longest in the main scanning direction X1. The fθ lens 231 causes incidence of the light beam L that was deflection-scanned in the main scanning direction X1 (longitudinal direction W) by the deflection-scanning component 223. The beam-detection reflecting mirror 232 guides the light beam L deflection-scanned by a reflective surface 223a of the deflection-scanning component, 223 to the beam detection lens 233.

Also, considering the detection accuracy of the beam detector 234, it is necessary to make the first optical path length from the deflection-scanning component 223 to the scanning object (photoreceptor drum 3) equal to or substantially equal to the second optical path length from the deflection-scanning component 223 to the beam detector 234, thereby to make the beam diameter of the light beam L exposed by the photoreceptor drum 3 equal to or substantially equal to the beam diameter of the light beam L exposed by the beam detector 234. However, in this example, the first optical path length is longer than the second optical path length. Therefore, the light beam L from the beam-detection reflecting mirror 232 is focused on the beam detector 234 by using the beam detection lens 233. As a result, even if the first optical path length is longer than the second optical path length, the beam diameter of the light beam L in the photoreceptor drum 3 and the beam diameter of the light beam L in the beam detector 234 are made equal or substantially equal. The beam detection lens 233 can tolerate a certain degree of deviation of the optical axis of the light beam L.

In order to take the main scanning start time (image writing start time) of the light beam L, the beam detector 234 receives the light beam L at a time before the start of the main scan and outputs a beam detection signal (BD signal) indicating the time before the start of the main scan. The beam detector 234 is an optical sensor (BD sensor) that acts as a synchronization detection element. In the present embodiment, the beam detector 234 uses the synchronization signal (BD signal) obtained by detecting the output signal from the beam detector 234 to adjust the time of the scanning start position of image recording on the surface of the photoreceptor drum 3. The optical scanning device 200 further includes a substrate 240 (a substrate for the light source and the beam detector). A light source 211 and a beam detector 234 are provided on the substrate 240.

The housing 201 has a bottom plate 201a with a rectangular shape and four side plates 201b to 201e surrounding the bottom plate 201a. The housing 201 is provided with a deflection-scanning chamber 203 (see FIGS. 4 to 6) that encloses the deflection-scanning unit 220. An opening 203a (see FIG. 6) is provided in a portion corresponding to the deflection-scanning chamber 203 in the bottom plate 201a. The opening 203a is closed by the lower lid 204. The lower lid 204 is attached to the bottom surface (lower surface) side of the bottom plate 201a by a plurality of attachment components (screws) SC. A deflection-scanning unit 220 is arranged on the lower lid 204, and the deflection-scanning unit 220 is housed in the deflection-scanning chamber 203 by attaching the lower lid 204 to the bottom plate 201a.

The light beam L reflected by the light source reflecting mirror 215 is incident on the inside of the deflection-scanning chamber 203 through the first window 203b (see FIG. 5) formed in the deflection-scanning chamber 203. Further, the light beam L scanned by the deflection-scanning component 223 is emitted to the outside of the deflection-scanning chamber 203 through the first window 203b. A first dustproof glass plate 235 (transparent body) is provided in the first window 203b. As a result, it is possible to effectively prevent unnecessary substances such as dust from entering into the deflection-scanning chamber 203. Further, the light beam L that has passed through the fθ lens 231 is emitted to the outside of the housing 201 through the second window 201f formed in the side plate 201e of the housing 201 on the side of the fθ lens 231. A second dustproof glass plate 236 (transparent body) is provided in the second window 201f.

As a result, it is possible to effectively prevent unnecessary substances such as dust from entering into the housing 201.

The substrate 240 is a flat plate shaped, printed substrate that has a circuit for driving the light source 211. The substrate 240 is attached to the outside of the side plate 201d on the side opposite to the fθ lens 231 of the housing 201 so that the emitting portion of the light source 211 and the light receiving portion of the beam detector 234 face to the inside of the housing 201. The emitting portion of the light source 211 and the light receiving portion of the beam detector 234 face to the inside of the housing 201 through respective openings (not illustrated) formed in the side plate 201d. As a result, the light source 211 can emit the light beam L from the emitting portion toward the collimator lens 212 in the housing 201. The beam detector 234 can receive the light beam L from the beam detection lens 233 in the housing 201, by using the light receiving portion.

Further, the deflection-scanning substrate 221 is a flat plate-shaped printed substrate that has a circuit for driving the deflection-scanning motor 222. The deflection-scanning motor 222 is attached to the deflection-scanning substrate 221, and the central portion of the deflection-scanning component 223 is connected and attached to the rotating shaft 222a of the deflection-scanning motor 222. The deflection-scanning component 223 is rotationally driven by the deflection-scanning motor 222.

Next, the optical path of light beam L from the light source 211 until entering the photoreceptor drum 3 will be described.

The light beam L of the light source 211 is transmitted through the collimator lens 212, thus becomes substantially parallel light, is narrowed by the aperture component 213, is transmitted through the cylindrical lens 214, becomes incident on and then reflected by the light source reflecting mirror 215, and becomes incident on a reflective surface 223a of the deflection-scanning component 223. The deflection-scanning component 223 is rotated at a constant angular velocity in a predetermined rotation direction R by the deflection-scanning motor 222, reflects the light beam L sequentially on each reflective surface 223a, and repeatedly deflects the light beam L in the main scanning direction X1 at a constant angular velocity. The fθ lens 231 focuses the light beam L on the surface of the photoreceptor drum 3 so as to have a predetermined beam diameter in both the main scanning direction X1 and the sub-scanning direction. Further, the fθ lens 231 converts the light beam L deflected in the main scanning direction X1 by the deflection-scanning component 223 at a constant angular velocity, so it moves at a constant linear velocity on the photoreceptor drum 3. As a result, the light beam L can repeatedly scan the surface of the photoreceptor drum 3 in the main scanning direction X1.

Further, the beam detector 234 causes the light beam L reflected by the beam-detection reflecting mirror 232, to be incident immediately before the main scanning (writing) of the photoreceptor drum 3 is started. The beam detector 234 receives the light of the light beam L at the time immediately before the start of the main scanning of the surface of the photoreceptor drum 3 and outputs a BD signal indicating the time immediately before the start of the main scanning. The start time of the main scan of the photoreceptor drum 3, on which the toner image in formed, is set according to the BD signal, and the writing by the light beam L according to the image data is started. Then, the two-dimensional surface (peripheral surface) of the photoreceptor drum 3, which is rotationally driven and charged, is scanned by the light beam L, and each electrostatic latent image is formed on the surface of the photoreceptor drum 3.

Also, the closer the incident angle of the light beam L incident on the first dustproof glass plate 235 is to a right angle, the more the light transmission improves accordingly. In this regard, since the light beam L is scanned in the main scanning direction X1, if the first dustproof glass plate 235 is provided along the longitudinal direction W of the fθ lens 231, for example, the following inconveniences occur. That is, the light beam L (directed to the beam detector 234 from the deflection-scanning component 223 light beam L) outside of the scanning area α (see FIGS. 8A and 9), which is from the scanning start position to the scanning end position of the light beam L based on the deflection-scanning component 223 in relation to the first dustproof glass plate 235, is too far inclined with respect to the first dustproof glass plate 235, and so the light transmission deteriorates.

In this respect, in the present embodiment, the first dustproof glass plate 235 is inclined so as to face the beam detector 234 with respect to the longitudinal direction W of the fθ lens 231. In this way, not only is it possible to avoid deterioration of the light transmission of the light beam L at the scanning area α with respect to the first dustproof glass plate 235, but it is also possible to avoid deterioration of light transmission of the light beam L from the deflection-scanning component 223 toward the beam detector 234 with respect to the first dustproof glass plate 235. Further, the deflection-scanning substrate 221 is arranged in parallel to or substantially parallel to the first dustproof glass plate 235.

About the Present Embodiments

The optical scanning device 200 according to the present embodiment detects, by using the beam detector 234, the main scanning start time of the light beam L emitted from the light source 211 and deflection-scanned in the main scanning direction X1 by the deflection-scanning component 223.

Next, the first to third embodiments will be described below with reference to FIGS. 8A to 12B.

First Embodiment

In the optical scanning device 200 according to the first embodiment, on the light source 211 and the beam detector 234, the emission side (emitting portion) of the light source 211 and light receiving side (light receiving portion) of the beam detector 234 face the light-incident side of the fθ lens 231, which is longest in the main scanning direction X1 and causes incidence of a light beam L detection-scanned by the deflection-scanning component 223. Further, in the examples shown in FIGS. 8A and 8B, on the light source 211 and the beam detector 234, the light source 211 is arranged on the upstream side and the beam detector 234 is arranged on the downstream side in the main scanning direction X1, in the longitudinal direction W of the fθ lens 231. In the example shown in FIG. 9, on the light source 211 and the beam detector 234, the beam detector 234 is arranged on the upstream side and the light source 211 is arranged on the downstream side in the main scanning direction X1, in the longitudinal direction W of the fθ lens 231. In this way, wasted space (particularly the space between the light source 211 and the deflection-scanning component 223) can be reduced, and as a result, the housing 201 can be decreased in size.

The light source 211 and the beam detector 234 are disposed along the main scanning direction X1. In this way, the light source 211 and the beam detector 234 can be arranged in a row in the main scanning direction X1, and the size of the housing 201 can be decreased accordingly.

In the examples shown in FIGS. 8A and 8B, the light beam L (L1) incident on the deflection-scanning component 223 and the light beam L (L2) incident on the beam detector 234 intersect (see FIG. 8A) when viewed from the direction of the rotational axis of the deflection-scanning component 223 (height direction H of the fθ lens 231). In this way, wasted space can be further reduced, and as a result, the housing 201 can be further decreased in size.

Second Embodiment

In the optical scanning device 200 according to the first embodiment, the beam detector 234 is arranged on the main scanning start side with respect to the light beam L. In this way, the beam detector 234 can reliably detect the main scanning start time of the light beam L.

Also, the beam detector 234 is arranged on the main scanning start side with respect to the light beam L, but the beam detector 234 may be arranged on the main scanning end side with respect to the light beam L.

Figure 10:
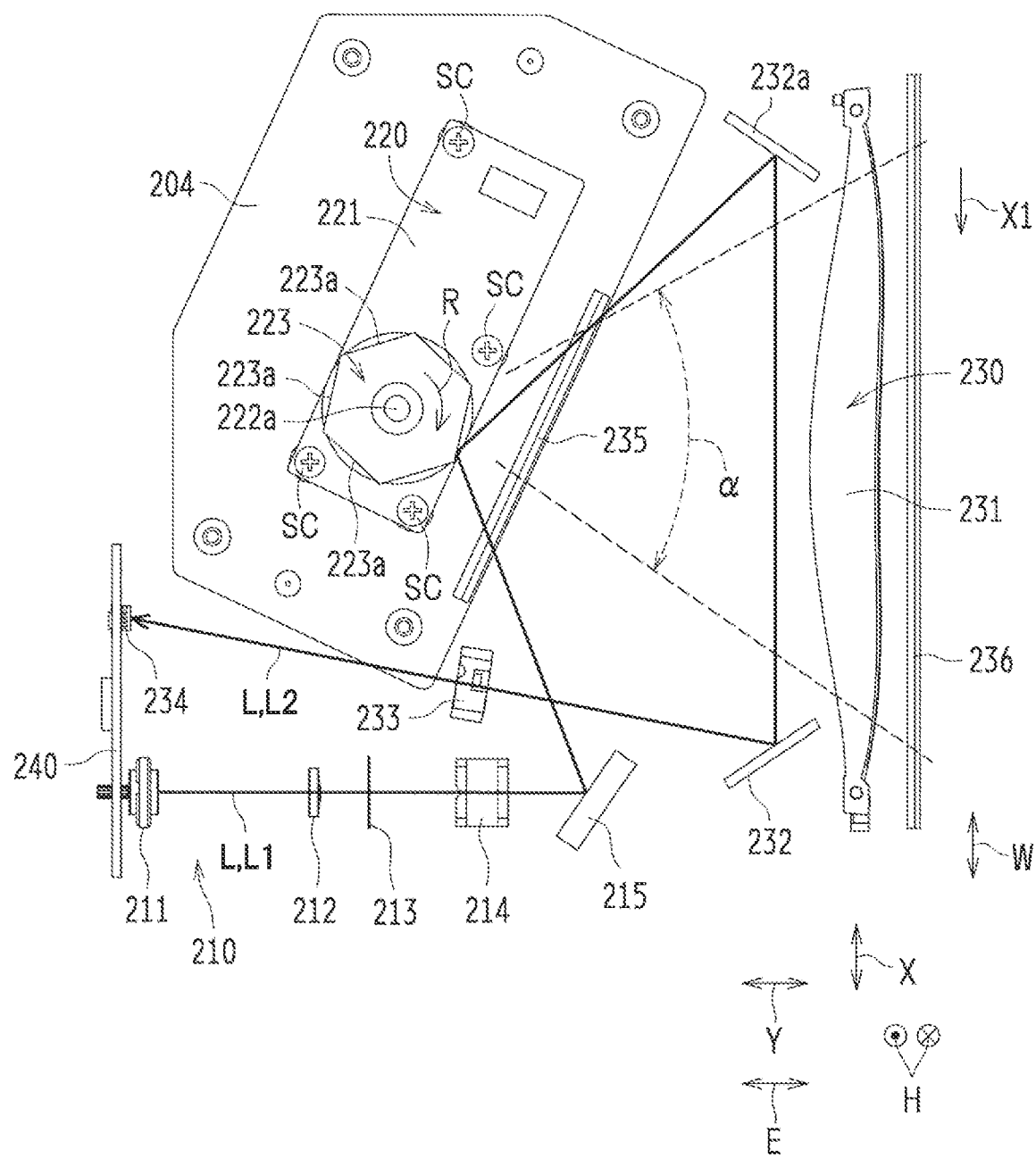
FIG. 10 is a plan view illustrating an example of the positional relationship between the light source and the beam detector in the optical scanning device according to the second embodiment.
Figure 11:
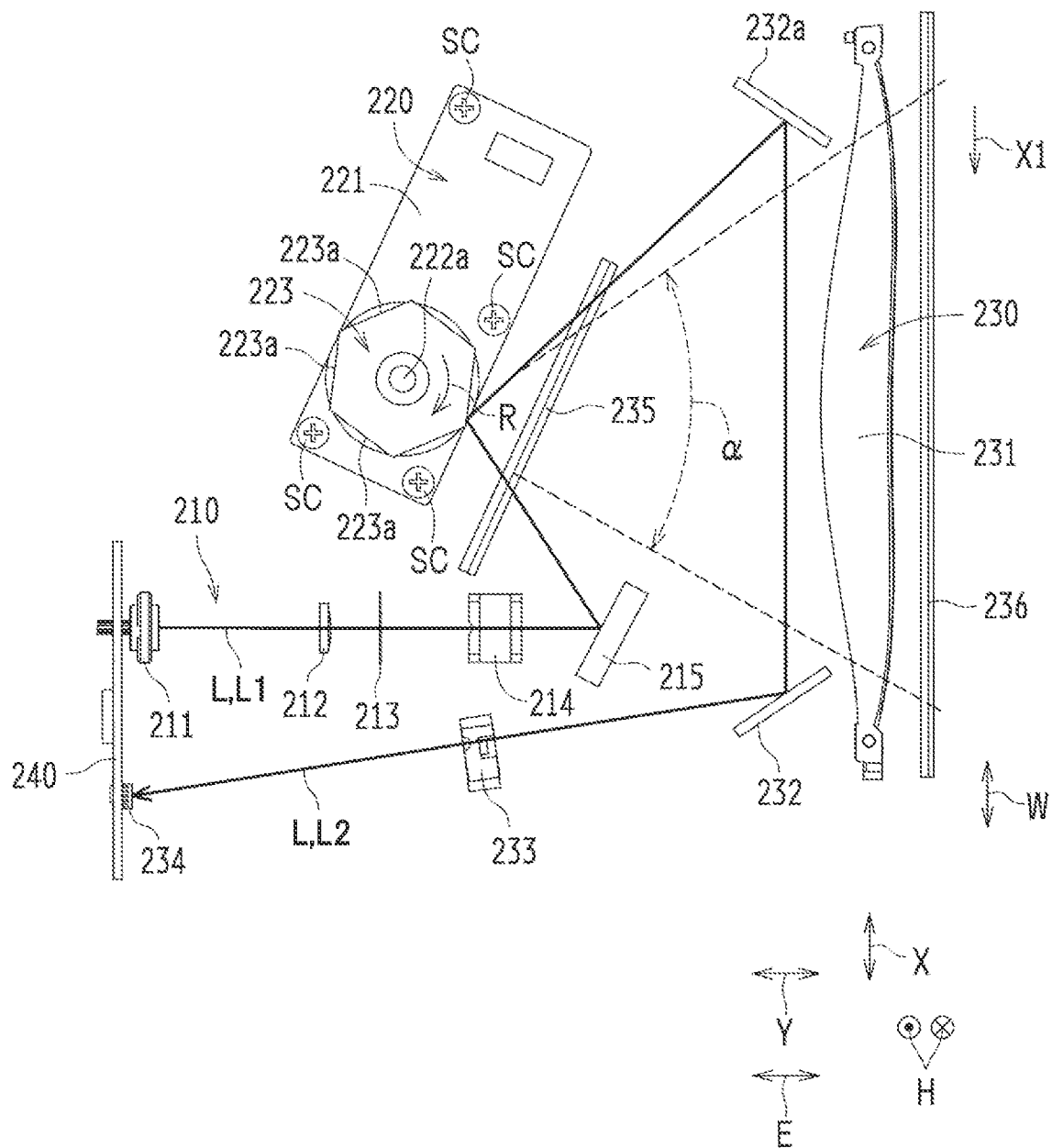
FIG. 11 is a plan view showing another example of the positional relationship between the light source and the beam detector in the optical scanning device according to the second embodiment.

FIGS. 10 and 11 are plan views respectively illustrating an example and another example of the positional relationship between the light source 211 and the beam detector 234 in the optical scanning device 200 according to the second embodiment.

In the example shown in FIG. 10, the beam detector 234 is arranged on the upstream side and the light source 211 is arranged on the downstream side in the main scanning direction X1, in the longitudinal direction W of the fθ lens 231. In the example shown in FIG. 11, the light source 211 is arranged on the upstream side and the beam detector 234 is arranged on the downstream side in the main scanning direction X1, in the longitudinal direction W of the fθ lens 231. In this way, wasted space (particularly the space between the light source 211 and the deflection-scanning component 223) can be reduced, and as a result, the housing 201 can be decreased in size.

The beam detector 234 is arranged on the main scanning end side with respect to the light beam L. In this way, although it is necessary to add a beam-detection reflecting mirror 232a on the main scanning start side with respect to the light beam L for causing the light beam L from the deflection-scanning component 223 to be incident on the beam detector 234, the beam detector 234 can detect the main scan start time of the light beam L on the main scanning end side with respect to the light beam L.

In the example shown in FIG. 10, the light beam L (L1) incident on the deflection-scanning component 223 and the light beam L (L2) incident on the beam detector 234 intersect when viewed from the height direction H of the fθ lens 231. In this way, wasted space can be further reduced, and as a result, the housing 201 can be further decreased in size.

Third Embodiment

Figure 12A:
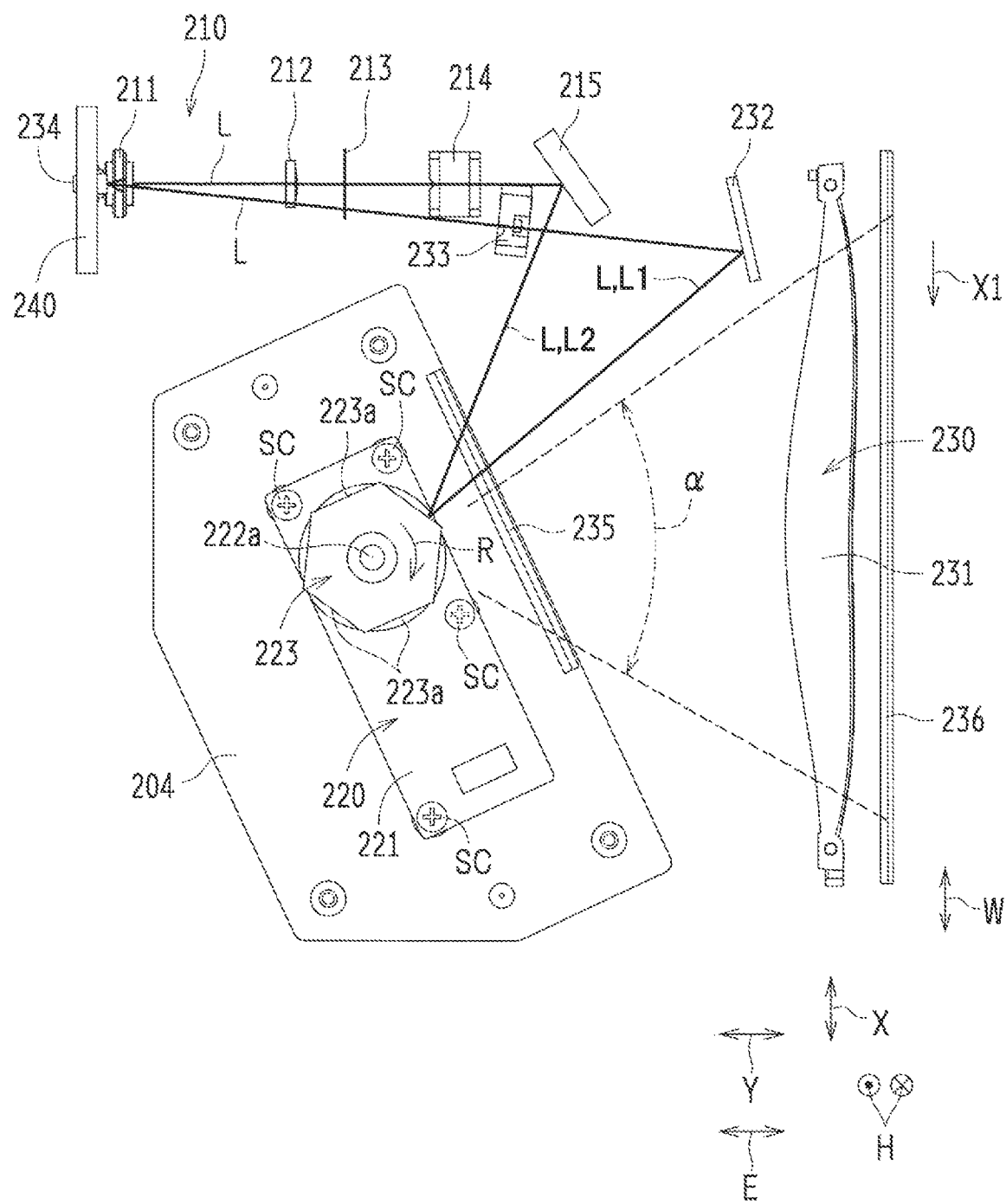
FIG. 12A is a plan view showing an example of the positional relationship between the light source and the beam detector in the optical scanning device according to the third embodiment.
Figure 12B:
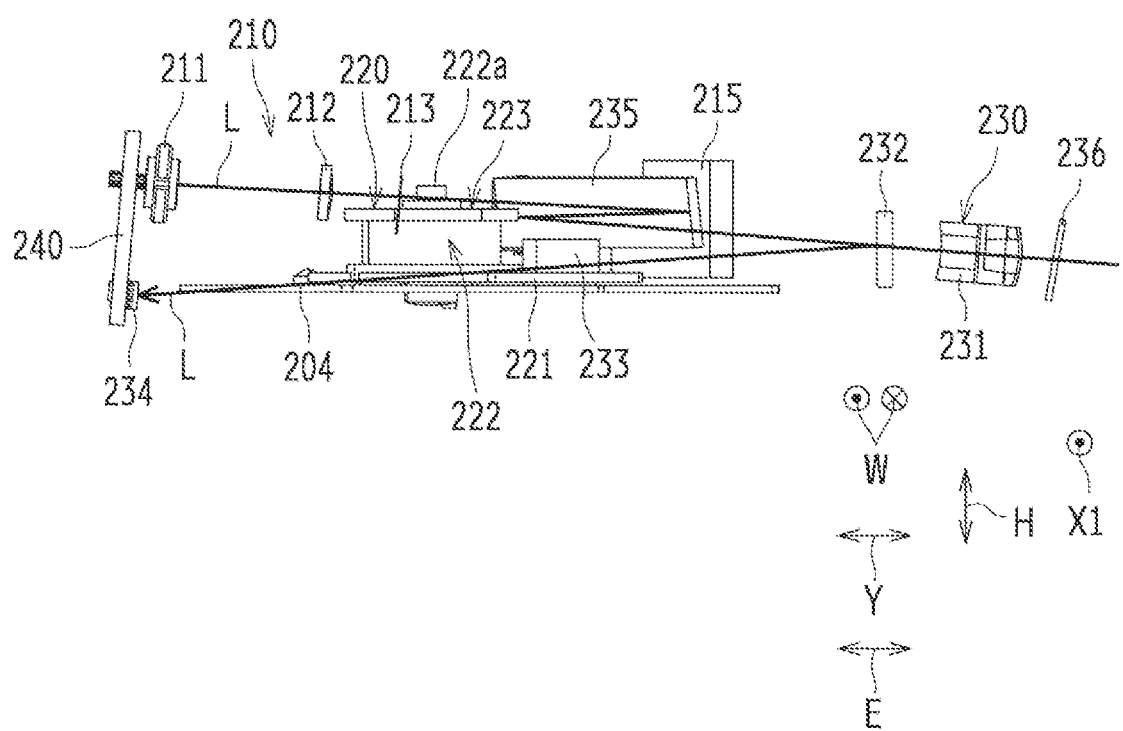
FIG. 12B is a front view showing an example of the positional relationship between the light source and the beam detector in the optical scanning device according to the third embodiment.

FIGS. 12A and 12B are a plan view and a front view, each illustrating an example of the positional relationship between the light source 211 and the beam detector 234 in the optical scanning device 200 according to the third embodiment.

In the example shown in FIGS. 12A and 12B, the light source 211 and the beam detector 234 are arranged at the same position in the longitudinal direction W of the fθ lens 231 (so that the optical axes are aligned in the height direction H). In this way, the space for providing the light source 211 and the beam detector 234 in the longitudinal direction W of the fθ lens 231 can be reduced as much as possible, and as a result, the housing 201 can be further decreased in size.

The beam detector 234 is arranged on the main scanning start side with respect to the light beam L. In this way, the beam detector 234 can reliably detect the main scanning start time of the light beam L. Further, the light beam L (L1) incident on the deflection-scanning component 223 and the light beam L (L2) incident on the beam detector 234 intersect when viewed from the height direction H of the fθ lens 231. It is noted that the beam detector 234 may also be arranged on the main scanning end side with respect to the light beam L. It is also possible that the light beam L (L1) incident on the deflection-scanning component 223 and the light beam L (L2) incident on the beam detector 234 may not intersect when viewed from the height direction H of the fθ lens 231.

About the First to Third Embodiments

In the first to third embodiments, the light source reflecting mirror 215 is provided nearer than the fθ lens 231 is to a side of the deflection-scanning component 223 in the orthogonal direction E that is orthogonal to both the main scanning direction X1 (longitudinal direction W of the fθ lens 231) and the direction of the rotational axis (height direction H) of the deflection-scanning component 223. The light source reflecting mirror 215 reflects the light beam L emitted from the light source 211 toward the deflection-scanning component 223. In this way, the light beam L from the light source 211 can be folded back to the side opposite to the fθ lens 231 by the light source reflecting mirror 215, and the size of the housing 201 can be reduced accordingly.

In the first to third embodiments, the substrate 240 is a single substrate provided along the main scanning direction X1 (longitudinal direction W of the fθ lens 231). The substrate 240 is provided with a light source 211 and a beam detector 234. In this way, the light source 211 and the beam detector 234 can be integrated on a single substrate, and the size of the housing 201 can be decreased accordingly.

In the first to third embodiments, the light source 211 and the beam detector 234, with the deflection-scanning component 223 in between, are provided on the side opposite to the fθ lens 231 on the wall surface side (the outer wall surface of the side plate 201d via the substrate 240) in the housing 201 of the optical scanning device 200. In this way, the space in the housing 201 can be effectively used.

In the first to third embodiments, the beam-detection reflecting mirror 232 is provided nearer than the fθ lens 231 is to the deflection-scanning component 223 in the orthogonal direction E that is orthogonal to both the main scanning direction X1 and the rotational axis direction (height direction H) of the deflection-scanning component 223. The beam-detection reflecting mirror 232 reflects the light beam L from the deflection-scanning component 223 toward the beam detector 234. In this way, the light beam L from the deflection-scanning component 223 can be folded back to the side opposite to the fθ lens 231 by the beam-detection reflecting mirror 232, and the size of the housing 201 can be reduced accordingly.

In the first to third embodiments, the beam-detection reflecting mirror 232 is arranged nearer than the light source reflecting mirror 215 is to the side of the fθ lens 231 in the orthogonal direction E that is orthogonal to both the main scanning direction X1 and the rotational axis direction (height direction H) of the deflection-scanning component 223. In this way, the space between the light source reflecting mirror 215 and the fθ lens 231 can be effectively used.

In the first embodiment and the second embodiment, the cylindrical lens 214 is provided on the optical path of the light beam L between the light source 211 and the deflection-scanning component 223 (in this example, the light source reflecting mirror 215). The beam detection lens 233 is provided on the optical path of the light beam L between the deflection-scanning component 223 (in this example, the reflective beam detection mirror 232) and the beam detector 234. The arrangement position of the cylindrical lens 214 and the arrangement position of the beam detection lens 233 overlap in the orthogonal direction E that is orthogonal to both the main scanning direction X1 (longitudinal direction W of the fθ lens 231) and the direction of the rotational axis (height direction H) of the deflection-scanning component 223 when viewed from the height direction H of the fθ lens 231. In this way, the cylindrical lens 214 and the beam detection lens 233 can be integrated into one place in the orthogonal direction E, and the size of the housing 201 can be reduced accordingly.

The present invention is not limited to the embodiments described above, and can be implemented in various other forms. Therefore, the embodiments are merely examples in all respects and should not be interpreted to limit the present invention. The range of the present invention is shown by the range of claims and is not bound by the text of the specification. Further, all modifications and changes belonging to the equivalent range of the claims are within the range of the present invention.

DESCRIPTION OF THE DRAWINGS

100 Image forming apparatus
200 Optical scanning device
201 Housing
201a Bottom plate
201b Side plate
201d Side plate
201e Side plate
201f Second window
202 Upper lid
203 Deflection-scanning chamber
203a Opening
203b First window
204 Lower lid
210 Incident optical system
211 Light source
212 collimator lens
213 Aperture component
214 Cylindrical lens
215 Light source reflecting mirror
220 Deflection-scanning unit
221 Deflection-scanning substrate
222 Deflection-scanning motor
222a Rotating shaft
223 Deflection-scanning component
223a Reflective surface
230 Emission optical system
231 fθ lens
232 Beam-detection reflecting mirror
232a Beam-detection reflecting mirror
233 Beam detection lens
234 Beam detector
235 First dustproof glass plate
236 Second dustproof glass plate 240 Substrate
3 Photoreceptor drum (scanning object)
E Orthogonal direction
H Height direction
L Light beam
R Rotation direction
W Longitudinal direction
X1 main scanning direction
α scanning area

What is claimed is:

1. An optical scanning device comprising:
a light source;
a beam detector that takes a main scanning start time of a light beam emitted from the light source and deflection-scanned in a predetermined main scanning direction by a deflection-scanning component; and
a light source reflecting mirror that reflects the light beam emitted from the light source toward the deflection-scanning component,
wherein on the light source and the beam detector, an emission side of the light source and a light receiving side of the beam detector face a light-incident side of an fθ lens, which is longest in the main scanning direction,
wherein in the main scanning direction, the light source is arranged on an upstream side in the main scanning direction and the beam detector is arranged on a downstream side in the main scanning direction, or the beam detector is arranged on the upstream side in the main scanning direction and the light source is arranged on the downstream side in the main scanning direction, and
wherein in an orthogonal direction that is orthogonal to both the main scanning direction and a direction of a rotational axis of the deflection-scanning component, the light source reflecting mirror is provided nearer than the fθ lens is to a side of the deflection-scanning component.

2. The optical scanning device according to claim 1,
wherein the light source and the beam detector are disposed along the main scanning direction.

3. The optical scanning device according to claim 1,
wherein the light beam incident on the deflection-scanning component and the light beam incident on the beam detector intersect when viewed from the direction of the rotational axis of the deflection-scanning component.

4. The optical scanning device according to claim 1,
wherein the light source and the beam detector are arranged on a main scanning start side with respect to the light beam.

5. The optical scanning device according to claim 1, further comprising:
a single substrate provided along the main scanning direction,
wherein the light source and the beam detector are provided on the single substrate.

6. The optical scanning device according to claim 1, further comprising:
a cylindrical lens provided on an optical path of the light beam between the light source and the deflection-scanning component; and
a beam detection lens that focuses the light beam on the beam detector, by being provided on the optical path of the light beam between the deflection-scanning component and the beam detector,
wherein an arrangement position of the cylindrical lens and an arrangement position of the beam detection lens overlap in the orthogonal direction that is orthogonal to both the main scanning direction and the direction of the rotational axis of the deflection-scanning component when viewed from a height direction of the fθ lens.

7. An image forming apparatus comprising the optical scanning device according to claim 1.

8. An optical scanning device comprising:
a light source; and
a beam detector that takes a main scanning start time of a light beam emitted from the light source and deflection-scanned in a predetermined main scanning direction by a deflection-scanning component,
wherein on the light source and the beam detector, an emission side of the light source and a light receiving side of the beam detector face a light-incident side of an fθ lens, which is longest in the main scanning direction;
wherein in the main scanning direction, the light source is arranged on an upstream side in the main scanning direction and the beam detector is arranged on a downstream side in the main scanning direction, or the beam detector is arranged on the upstream side in the main scanning direction and the light source is arranged on the downstream side in the main scanning direction; and
wherein the light source and the beam detector, with the deflection-scanning component in between, are provided on a wall surface side on a side opposite the fθ lens in a housing of the optical scanning device.

9. The optical scanning device according to claim 8,
wherein the light source and the beam detector are disposed along the main scanning direction.

10. The optical scanning device according to claim 8,
wherein the light beam incident on the deflection-scanning component and the light beam incident on the beam detector intersect when viewed from a direction of a rotational axis of the deflection-scanning component.

11. The optical scanning device according to claim 8,
wherein the light source and the beam detector are arranged on a main scanning start side with respect to the light beam.

12. The optical scanning device according to claim 8, further comprising:
a single substrate provided along the main scanning direction,
wherein the light source and the beam detector are provided on the single substrate.

13. The optical scanning device according to claim 8, further comprising:
a cylindrical lens provided on an optical path of the light beam between the light source and the deflection-scanning component; and
a beam detection lens that focuses the light beam on the beam detector, by being provided on the optical path of the light beam between the deflection-scanning component and the beam detector,
wherein an arrangement position of the cylindrical lens and an arrangement position of the beam detection lens overlap in an orthogonal direction that is orthogonal to both the main scanning direction and a direction of a rotational axis of the deflection-scanning component when viewed from a height direction of the fθ lens.

14. An image forming apparatus comprising the optical scanning device according to claim 8.

15. An optical scanning device comprising:
a light source;

a beam detector that takes a main scanning start time of a light beam emitted from the light source and deflection-scanned in a predetermined main scanning direction by a deflection-scanning component; and a beam-detection reflecting mirror that reflects the light beam from the deflection-scanning component toward the beam detector, wherein on the light source and the beam detector, an emission side of the light source and a light receiving side of the beam detector face a light-incident side of an fθ lens, which is longest in the main scanning direction; and wherein in the main scanning direction, the light source is arranged on an upstream side in the main scanning direction and the beam detector is arranged on a downstream side in the main scanning direction, or the beam detector is arranged on the upstream side in the main scanning direction and the light source is arranged on the downstream side in the main scanning direction, and wherein in an orthogonal direction that is orthogonal to both the main scanning direction and a direction of a rotational axis of the deflection-scanning component, the beam-detection reflecting mirror is provided nearer than the fθ lens is to a side of the deflection-scanning component.

16. The optical scanning device according to claim 15, wherein the light beam incident on the deflection-scanning component and the light beam incident on the beam detector intersect when viewed from the direction of the rotational axis of the deflection-scanning component.

17. The optical scanning device according to claim 15, wherein the light source and the beam detector are arranged on a main scanning start side with respect to the light beam.

18. The optical scanning device according to claim 15, further comprising:

a single substrate provided along the main scanning direction, wherein the light source and the beam detector are provided on the single substrate.

19. The optical scanning device according to claim 15, further comprising:

a light source reflecting mirror that reflects the light beam emitted from the light source toward the deflection-scanning component, wherein in the orthogonal direction that is orthogonal to both the main scanning direction and the direction of the rotational axis of the deflection-scanning component, the light source reflecting mirror is provided nearer than the fθ lens is to a side of the deflection-scanning component, and wherein the beam-detection reflecting mirror is arranged nearer than the light source reflecting mirror is to the side of the fθ lens in the orthogonal direction.

20. An image forming apparatus comprising the optical scanning device according to claim 15.

* * * * *